G. H. DYER.
SPACING MACHINE.
APPLICATION FILED MAR. 4, 1907.

899,294.

Patented Sept. 22, 1908.
2 SHEETS—SHEET 2.

WITNESSES:
F. E. Maynard.

INVENTOR:
George H. Dyer;
BY Geo. H. Strong.
ATTORNEY

UNITED STATES PATENT OFFICE.

GEORGE H. DYER, OF SAN FRANCISCO, CALIFORNIA.

SPACING-MACHINE.

No. 899,294.      Specification of Letters Patent.      Patented Sept. 22, 1908.

Application filed March 4, 1907. Serial No. 360,453.

*To all whom it may concern:*

Be it known that I, GEORGE H. DYER, citizen of the United States, residing in the city and county of San Francisco and State of California, have invented new and useful Improvements in Spacing-Machines, of which the following is a specification.

My invention relates to an apparatus which is designed for accurately spacing distances, and is particularly designed for use in conjunction with heavy metal beams and girders, in which it is desired to punch holes for the connection of other parts necessary in the contemplated structure, and which parts must be riveted or bolted to the beams.

It consists in the combination of parts and details of construction which will be more fully explained by reference to the accompanying drawings, in which—

Figure 1:
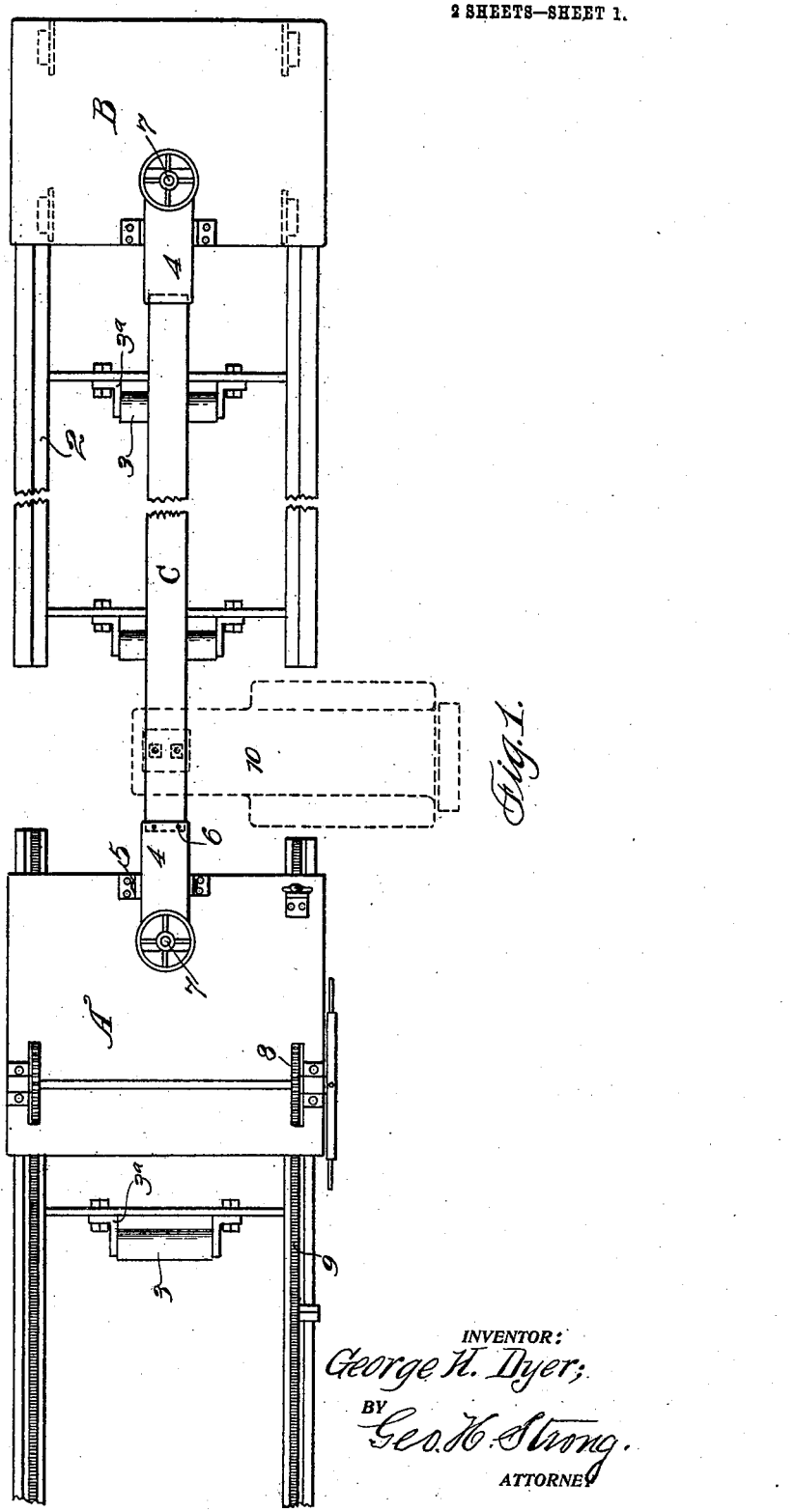
Figure 2:
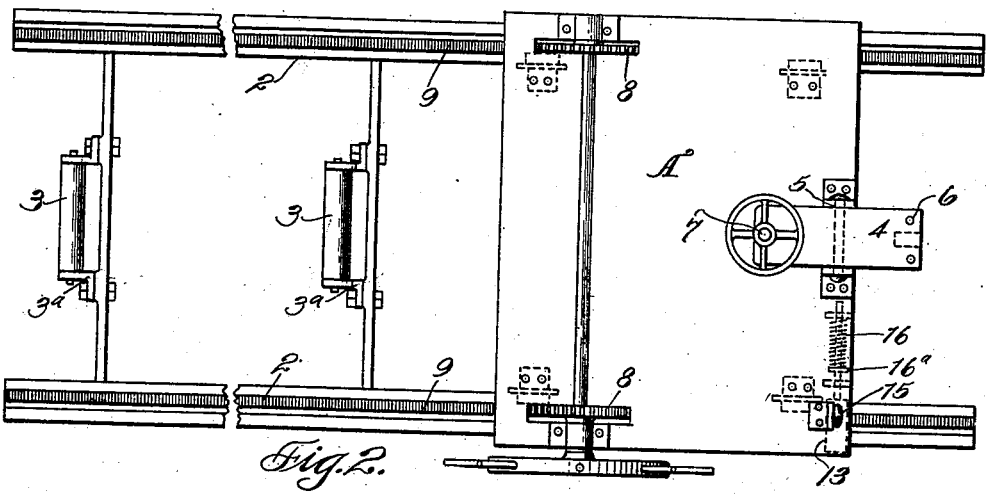
Figure 3:
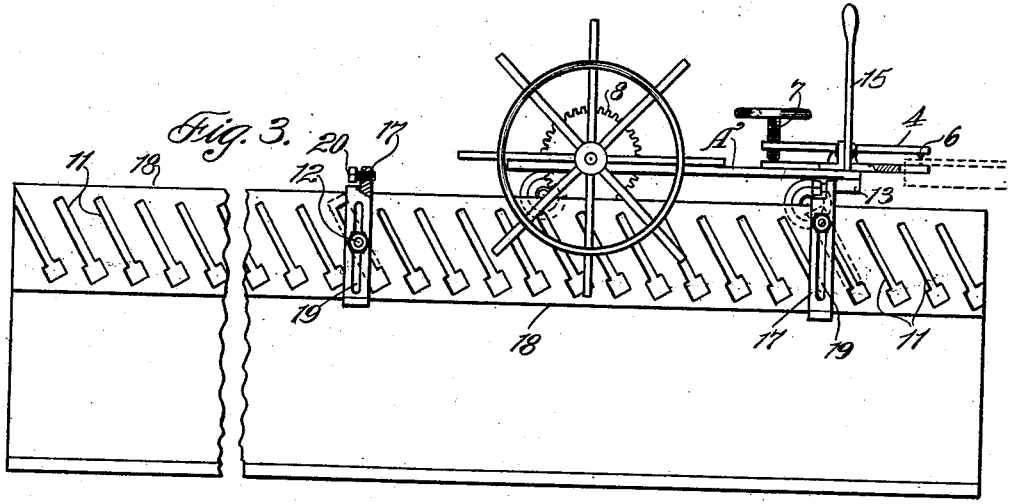
Figure 4:
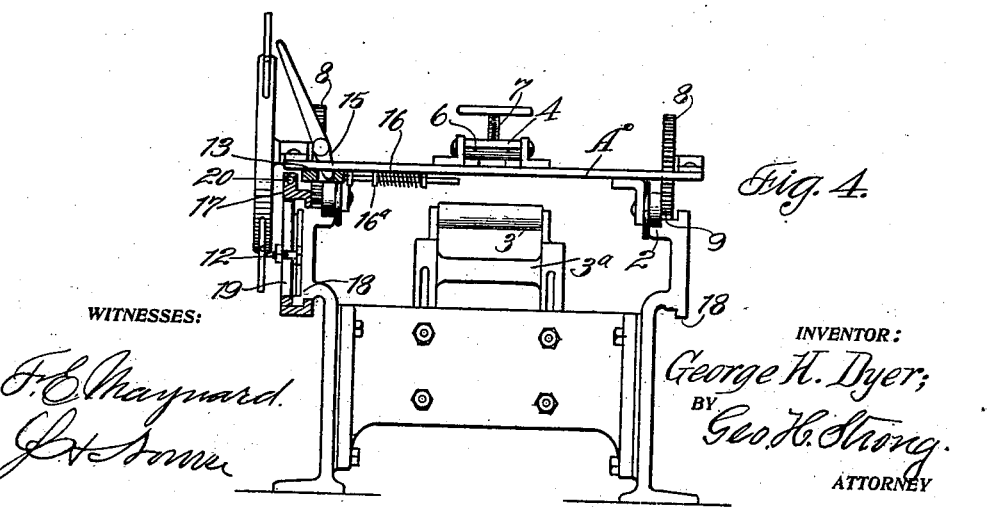

Figure 1 is a plan view of the device as in operation. Fig. 2 is a plan view of the feed-table. Fig. 3 is a side view of same; and Fig. 4 is an end view thereof.

The heavy T channel and other beams, plates, angles and etc. which are employed in steel frame buildings and like structures, are riveted or otherwise secured together, and in laying them out, they are marked where holes are to be punched in the webs or flanges for the connection of other portions of the structure. These beams are usually very heavy, and it is the object of my invention to provide a means for accurately moving them with relation to the punching press, so that the required holes shall be so accurately punched as to register with the part which is to be connected therewith.

A and B are two carriages having wheels adapted to travel upon a track as at 2. These carriages are separated to any required extent to support the beam to be punched which is indicated at C.

The beam is clamped or otherwise secured upon the carriages, and if required, intermediate supporting rollers 3 are journaled upon vertical adjustable frames 3ª at points between the two carriages so as to prevent the beam from sagging, and also to support it beyond the carriage.

Any suitable clamping device may be employed to firmly hold the ends of the beams upon their respective carriages. I have here illustrated such a device as consisting of a tiltable plate 4, fulcrumed upon a shaft or bearing 5 intermediate of its length. This plate may have spurs or teeth as at 6 which are adapted to press upon the beam and clamp it between this plate and the support below.

By means of a wheel, or otherwise actuated screw at 7, the locking plate may be tilted about its fulcrum, and the spurs or teeth caused to grip the beam or part to be held with sufficient firmness to maintain it in position. Being thus clamped to the two carriages, it will be manifest that power applied to advance one of the carriages will, through the connection of the beam, advance both. Such a means may consist of toothed wheels 8 journaled or mounted upon a shaft upon one of the carriages as at A, and the teeth engage with rack teeth 9 upon the frame or track upon which the carriages are made to travel.

Any suitable punching or perforating apparatus may be employed as indicated at 10, and the beam to be punched is caused to travel in line beneath the punch or punches in the above manner.

In order to accurately adjust and limit the movement of the beam so as to bring the points to be punched accurately beneath the punches of the press, I have shown a series of inclined slots as at 11. These slots are made in the side of the stationary frame. Exterior to this frame are stops 17 which are here shown as hooking or clamping over the upper and lower edges of guides 18 upon the main frame of the apparatus. These stops are slotted vertically as shown at 19, and the vertical slots cross the slots 11 diagonally.

Bolts 12 pass through the slots 11 and 19 with square or diamond head, and it will be seen that by loosening the nut on the bolts, these slidable stops 17 may be moved to either right or left, thus setting them at any desired point, and with great accuracy on account of the small amount of movement effected by the up or down movement of the bolt 12.

For still more accurate adjustments, screws 20 may be made to pass through lugs in the upper end of the stops 17, and when these stops are properly set, the carriage upon which the beam is supported is arrested by these stops as follows: A transversely guided and slidable bolt 13 is mounted upon the plate or carriage A, and is normally actuated by a spring 16 pressing against a collar 16ª which forces the bolt outwardly until its head is in line with the upper end of the stop 17, or the screw 20, so that when the carriage has been advanced to the desired point, the head of this bolt 16 will contact with the stop and arrest its movement.

The head of the bolt 13 is made of considerable size and is slotted or channeled to receive the end of a fulcrumed lever 15. This lever may be moved by hand to withdraw the stop bolt and allow it to pass the stop 17 when it is desired to advance the carriage and beam to another point.

As many of the stops 17 may be employed as found desirable or necessary, and it will be seen that the carriage and the beam carried thereby may be advanced until arrested by one of these stops, the hole or holes corresponding with this stop being then punched, the stop bolt may be withdrawn, the carriage again advanced, and until contact is made with the following stop, the next hole punched and so on, and the apparatus provides for any degree of accuracy that may be required.

Having thus described my invention, what I claim and desire to secure by Letters Patent is—

1. In a spacing apparatus, a guide frame having projecting flanges upon opposite edges, a carriage and means to advance it upon said frame, parallel and vertically inclined slots formed in the sides of the frame, stop bars having hook members adapted to engage and slide upon the projecting flanges of the frame, said stop bars having vertical slots made in them, a bolt extending through an inclined slot, and the vertical slot of the stop bar, means for adjusting said bolt up and down whereby a vernier adjustment of said bar is effected.

2. In a spacing apparatus of the character described, a horizontal guide frame having projecting flanges upon its outer edges, and parallel vertically inclined slots in its side, stop bars engaging and slidable upon the guide flanges, said stop bars having vertical slots made in them, bolts passing through the inclined slots of the frame, and the vertical slots of the stop bars whereby the stop bars may be accurately adjusted, a carriage movable upon the frame, said carriage having a spring-pressed transversely movable bolt normally projected so as to engage with the stop plate and means whereby the bolt may be retracted to allow the carriage to be advanced.

3. In a spacing apparatus of the character described, a horizontally disposed frame having lugs upon its upper and lower edges, parallel vertically inclined slots made in the sides, vertical stop bars adapted to engage the lugs of the frame and slidable thereon, said bars having vertically disposed slots crossing the line of the inclined slots of the frame, bolts passing through the inclined and vertical slots and movable to provide an accurate adjustment of the stops, a carriage, a track upon the frame, means for advancing the carriage thereon, a transversely movable stop bolt normally projecting to engage the stop, and means for retracting it to allow it to pass, clamps and supports upon the carriage for beams to be punched, said clamps consisting of horizontally fulcrumed tiltable plates having grips at one end adapted to clamp the beams, and screws at the opposite end for locking said grips.

4. In a spacing apparatus of the character described, a horizontal guide frame and tracks, said guide frame having vertically inclined slots and flanges projecting at top and bottom, carriages mounted to travel upon the tracks, vertically slotted stop-bars engaging and slidable upon said flanges, and bolts passing through said inclined and vertical slots whereby the stops may be adjusted either right or left, horizontally-fulcrumed tiltable clamping-jaws mounted upon each of the carriages, and means whereby said jaws are closed to grip beams and maintain the level of the surface to be punched, and a punching apparatus.

5. In a spacing apparatus of the character described, a horizontal guide frame and tracks, independent carriages movable thereon and intermediate vertically adjustable supports, a punching apparatus located between the carriages, said guide frame having vertically inclined slots and flanges projecting at top and bottom, vertically slotted stop bars engaging and slidable upon said flanges, bolts passing through both inclined and vertical slots, and adjustable up or down, said stops having supplemental adjusting screws, a transversely movable bolt upon the carriage normally projecting into the path of the stop, and means to retract it to allow the advance of the carriage and its load.

In testimony whereof I have hereunto set my hand in presence of two subscribing witnesses.

GEORGE H. DYER.

Witnesses:
Jos. H. McKenzie,
Walter J. Dyer.